United States Patent
Zou et al.

(10) Patent No.: US 11,699,931 B2
(45) Date of Patent: Jul. 11, 2023

(54) ROTOR STRUCTURE OF INTERIOR PERMANENT MAGNET MOTOR

(71) Applicant: Jing-Jin Electric Technologies Co., Ltd., Beijing (CN)

(72) Inventors: Xuan Zou, Beijing (CN); Liangliang Zhang, Beijing (CN); Chunshuang Feng, Beijing (CN); Chunxia Cai, Beijing (CN); Lei Han, Beijing (CN); Yang Zhang, Beijing (CN); Dandan Qi, Beijing (CN); Xin Xu, Beijing (CN); Kaihe Zhang, Beijing (CN); Biqing Sun, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 99 days.

(21) Appl. No.: 17/364,030

(22) Filed: Jun. 30, 2021

(65) Prior Publication Data
US 2022/0014057 A1    Jan. 13, 2022

(30) Foreign Application Priority Data

Jul. 9, 2020    (CN) .................... 202010658204.X

(51) Int. Cl.
| H02K 1/27 | (2022.01) |
| H02K 1/276 | (2022.01) |
| H02K 1/24 | (2006.01) |

(52) U.S. Cl.
CPC ........... *H02K 1/2766* (2013.01); *H02K 1/246* (2013.01); *H02K 2213/03* (2013.01)

(58) Field of Classification Search
CPC ... H02K 1/2766; H02K 1/246; H02K 2213/03
(Continued)

(56) References Cited

U.S. PATENT DOCUMENTS

| 2007/0063607 A1 | 3/2007 | Hattori |
| 2008/0093944 A1 | 4/2008 | Takahashi et al. |

(Continued)

FOREIGN PATENT DOCUMENTS

| CN | 110401282 A | 11/2019 |
| DE | 102015214169 A1 | 2/2017 |

(Continued)

OTHER PUBLICATIONS

European Search Report dated Dec. 8, 2021 issued in corresponding European application No. 21181259.9.
(Continued)

*Primary Examiner* — Terrance L Kenerly
(74) *Attorney, Agent, or Firm* — ArentFox Schiff LLP

(57) ABSTRACT

A rotor structure of a magnet motor includes a rotating shaft and an iron core on the rotating shaft. Magnet grooves are disposed inside the iron core along a circumferential direction with a magnet provided therein. A distance between an edge line of the magnet groove close to a circumferential edge of the iron core and the circumferential edge of the iron core varies so that a width of a flux barrier formed varies. One end of a long side of the magnet groove close to the circumferential edge is formed with an anti-demagnetization groove communicating with the magnet groove, and an edge line of the anti-demagnetization groove tilts toward the circumferential edge of the iron core. Process slots are provided between the magnet grooves and the circumferential edge of the iron core that are used to increase a salient rate and reluctance torque of the motor.

18 Claims, 2 Drawing Sheets

(58) Field of Classification Search
USPC .......................... 310/156.01, 156.53, 156.56
See application file for complete search history.

(56) References Cited

U.S. PATENT DOCUMENTS

| | | | |
|---|---|---|---|
| 2009/0026867 | A1 | 1/2009 | Haruno et al. |
| 2010/0117475 | A1 | 5/2010 | Leonardi et al. |
| 2012/0285004 | A1* | 11/2012 | Haruno ................ H02K 1/2766 29/598 |
| 2017/0063187 | A1 | 3/2017 | Hao et al. |
| 2017/0373573 | A1 | 12/2017 | Sidiropoulos |
| 2018/0175681 | A1* | 6/2018 | Tang .................... H02K 1/2706 |
| 2019/0199150 | A1 | 6/2019 | Cesa et al. |

FOREIGN PATENT DOCUMENTS

| | | |
|---|---|---|
| DE | 102016115562 A1 | 3/2017 |
| DE | 102017201029 A1 | 7/2018 |
| EP | 3021459 A1 | 5/2016 |
| JP | 2007-89291 A | 4/2007 |
| JP | 2008-104323 A | 5/2008 |
| WO | 2019171099 A1 | 9/2019 |

OTHER PUBLICATIONS

Japanese Office Action dated Jul. 4, 2022 issued in corresponding Japanese counterpart application No. 2021-114163.
Chinese Search Report dated Feb. 18, 2023 issued in corresponding Chinese Application No. 202010658204X.

* cited by examiner

ROTOR STRUCTURE OF INTERIOR PERMANENT MAGNET MOTOR

CROSS-REFERENCE TO RELATED APPLICATIONS

This application is claims priority to CN application No. 202010658204.X, filed Jul. 9, 2020, the disclosure of which is hereby incorporated by reference in its entirety.

TECHNICAL FIELD

The present disclosure belongs to the technical field of motor rotors, and particularly relates to a rotor structure of interior permanent magnet motor.

BACKGROUND

As the whole world pay more attention to environmental protection and energy security, traditional internal combustion vehicles are gradually replaced by vehicles with power systems using other energies, and electrified new energy vehicles are getting more and more attention. Recently, the requirements for the range and safety of new energy vehicles and thus the motor power density are becoming higher and higher. Without changing the topology, it is particularly important how to reduce the magnetic flux leakage in the motor and increase the salient rate of the motor while meeting the strength requirement.

Moreover, when the motor is running at high speed, the magnets generate eddy current loss and the corners of the magnets are easily demagnetized. Thus, it is also an urgent problem to be solved for those engineers how to reduce the demagnetization of magnet and increase the safety of electric vehicles.

SUMMARY

In view of the above problems, the present disclosure discloses a rotor structure of interior permanent magnet motor to overcome the above problems or at least partially solve the above problems.

In order to achieve the above object, the present disclosure adopts the following technical solutions.

A rotor structure of interior permanent magnet motor, wherein the rotor structure comprises a rotating shaft and an iron core arranged on the rotating shaft, a plurality of magnet grooves are provided inside the iron core along a circumferential direction, and the magnet groove may be provided a magnet therein;

a distance between an edge line of the magnet groove close to a circumferential edge of the iron core and the circumferential edge of the iron core varies, so that a width of a flux barrier formed varies, thereby reducing magnetic flux leakage in the motor;

and/or, at least one end of a long side of the magnet groove close to the circumferential edge of the iron core is formed with an anti-demagnetization groove communicating with the magnet groove, and a edge line of the anti-demagnetization groove tilts toward the circumferential edge of the iron core;

and/or, a number of process slots are provided between the magnet grooves and the circumferential edge of the iron core, and the process slots are used to increase a salient rate and reluctance torque of the motor, and reduce a motor rotor weight.

Optionally, the plurality of magnet grooves are divided into a number of groups, each group comprises a number of the magnet grooves, and either end or both ends of each magnet groove is provided with the anti-demagnetization groove.

Optionally, the edge line of the magnet groove close to the circumferential edge of the iron core is a first tilted straight line segment or a first arc segment.

Optionally, the edge line of the anti-demagnetization groove comprises a fifth straight line segment or a sixth straight line segment connected to the long side of the magnet, and the fifth straight line segment or the sixth straight line segment is not parallel to the long side of the magnet.

Optionally, the edge line of the anti-demagnetization groove further comprises a third straight line segment connected to the fifth straight line segment, and the third straight line segment is not parallel to the long side of the magnet;

or, the edge line of the anti-demagnetization groove further comprises a fourth straight line segment and a third straight line segment connected to the fifth straight line segment, the fifth straight line segment, the fourth straight line segment and the third straight line segment are connected in sequence, and the third straight line segment is not parallel to the long side of the magnet.

Optionally, the edge line of the anti-demagnetization groove comprises a number of second arc segments or third arc segments, and the second arc segments or the third arc segments extend toward the circumferential edge of the iron core.

Optionally, the edge line of the anti-demagnetization groove comprises any one or more of the following: a second arc segment, a third arc segment, a third straight line segment, a fourth straight line segment, a fifth straight line segment, or a sixth straight line segment.

Optionally, the process slots are symmetrically arranged about a direct axis (d-axis) of the motor.

Optionally, the process slots are provided within a preset angle range around the direct axis of the motor, and a ratio of an area of the process slot to an area of the magnet groove is greater than or equal to 5%.

Optionally, the preset angle range is (0-120)/p degrees, where p is a quantity of motor pole pairs, and the ratio is 5%-50%.

The advantages and beneficial effects of the present disclosure are as follows.

In the present disclosure, anti-demagnetization grooves are added at the sharp corners of the magnet, which can not only reduce the rotor weight, but also reduce the motor demagnetization, increase the residual magnetism of the motor after demagnetization, and improve the operation safety of the motor.

In the present disclosure, the width of the flux barrier varies, and the magnetic flux leakage of the motor can be reduced and the torque of the motor can be increased while the strength requirement is met, so low-grade magnets can be used to obtain the same torque and reduce the cost of the motor.

In the present disclosure, process slots are formed on the d-axis and near the d-axis, which not only reduces the rotor weight, but also increases the salient rate and reluctance torque and thus increases the power density of the motor.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

Figure 1:
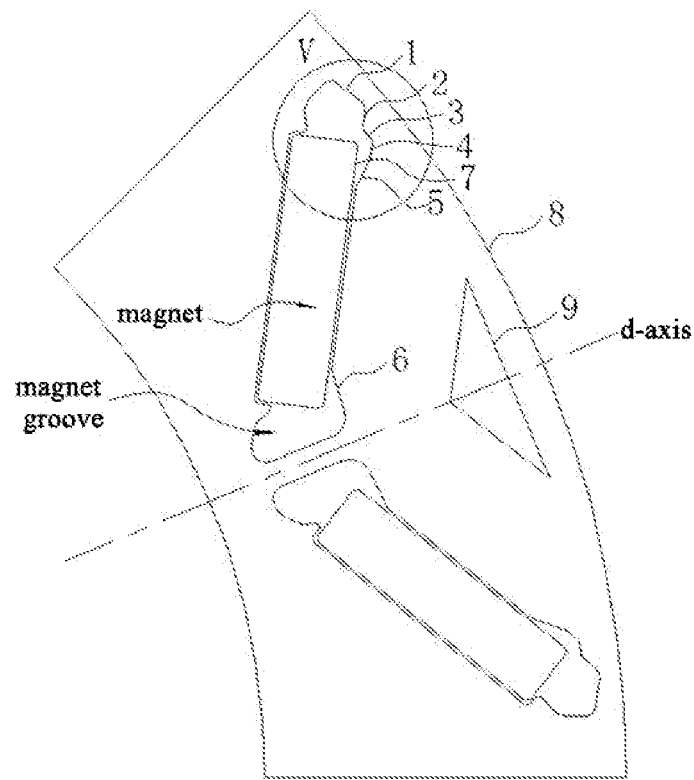
FIG. 1 is a partial schematic diagram of the structure of a rotor of interior permanent magnet motor according to an embodiment of the present disclosure.

In the drawings: 1: a first straight line segment or first arc segment; 2: a second straight line segment; 3: a third straight line segment; 4: a fourth straight line segment; 5: a fifth straight line segment; 6 a sixth straight line segment; 7: a long side of the magnet; 8: a circumferential edge arc; 9: a process slot; 10: a process slot; 11: a second arc segment; 12: a third arc segment.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

It should be understood that the terms "include/comprise", "consisting of" or any other variants are intended to cover non-exclusive inclusion, so that a product, equipment, process or method including a series of elements not only comprises those elements, but, if necessary, may also include other elements not explicitly listed, or elements inherent to the product, equipment, process, or method. In the case that there is no more limitation, the elements defined by the phrases "include/comprise" and "consisting of . . . " do not exclude that the product, equipment, process or method including the named elements further includes additional named elements.

It should also be understood that orientation or positional relationship indicated by the terms "upper", "lower", "front", "rear", "left", "right", "top", "bottom", "inner", "outer", etc. are orientation or positional relationship based on the drawings, which are merely for convenience of describing the present disclosure and simplifying the description, rather than indicating or implying that the device or component referred to must have a specific orientation, or must be constructed and operated with a specific orientation, they should not be construed as limiting the present disclosure.

In addition, the terms "first" and "second" are used for descriptive purposes only and are not to be construed as indicating or implying relative importance or implicitly indicating the number of named technical features. Thus, the features defined with "first" or "second" may explicitly or implicitly include one or more of these features. In the description of the present disclosure, "a plurality of" means two or more, unless otherwise particularly defined.

In the present disclosure, unless otherwise expressly defined and limited, the terms "installation", "connected", "connection", "fixed" and the like should be broadly understood, for example, it may be fixedly connected, or detachably connected, or integrally connected; it may also be mechanically connected, or electrically connected; it may also be directly connected, or indirectly connected through an intermediate element; it may also be the internal communication of two components or the interaction relationship between two components. For a person of ordinary skill in the art, the specific meaning of the above terms in the present disclosure should be understood according to specific circumstances.

The technical solutions according to the embodiments of the present disclosure will be described in detail below with reference to the accompanying drawings.

FIG. 1 is a partial schematic diagram of a rotor structure of interior permanent magnet motor according to an embodiment of the present disclosure. The overall structure of the motor rotor according to the present embodiment includes multiple structures as shown in FIG. 1, and is cylindrical as a whole.

The rotor structure according to the present embodiment comprises a rotating shaft (not shown in FIG. 1) and an iron core (a partial structure of the iron core is shown in FIG. 1) arranged on the rotating shaft, a plurality of magnet grooves are provided inside the iron core along a circumferential direction, and the magnet groove may be provided a magnet therein.

The distance between the edge line 1 of the magnet groove close to the circumferential edge of the iron core (at this point, the anti-demagnetization groove may not be provided) and the circumferential edge of the iron core varies, so that the width of the flux barrier formed varies, thereby reducing the magnetic flux leakage in the motor.

Alternatively, at least one end of a long side of the magnet groove close to the circumferential edge of the iron core is formed with an anti-demagnetization groove communicating with the magnet groove. The anti-demagnetization grooves formed at the two ends may be the same or different. According to FIG. 1, the two anti-demagnetization grooves on the upper and lower sides of the magnet can be the same or different in shape, and their edges include straight line segment 3, 4, 5, and 6. Of course, they may also include only some line segments among the straight line segments 3, 4, 5, and 6. Preferably, the straight line segments 5 and 6 of the anti-demagnetization groove tilt toward the circumferential edge of the iron core.

At this point, if an edge line 1 close to the circumferential edge of the iron core is provided, the edge line 1 is provided at the upper end of the anti-demagnetization groove.

Alternatively, a number of process slots 9, 10 are provided between the magnet grooves and the circumferential edge of the iron core, and the process slots 9, 10 are used to increase the salient rate and reluctance torque of the motor, and reduce the rotor weight, thereby increasing the power density of the motor. The process slots can be polygonal, circular, elliptical or irregular in shape, and their quantity is not limited.

In sum, in the rotor disclosed in the present embodiment, a structure in which the width of the flux barrier varies can be provided on the rotor to reduce the magnetic flux leakage of the motor; an anti-demagnetization groove structure can be provided on the rotor to not only reduce the rotor weight, but also reduce the demagnetization of the motor, increase the residual magnetism of the motor after demagnetization, and improve the operation safety of the motor; process slots can be provided on the rotor to increase a salient rate and reluctance torque of the motor, and reduce the rotor weight, thereby increasing the power density of the motor.

In an embodiment, the plurality of magnet grooves are divided into a number of groups, each group comprises a number of the magnet grooves, and two ends of each of the magnet grooves may be provided with the anti-demagnetization groove. Each group of magnet grooves can form a magnetic pole, and the number of the magnet grooves in each group can form a linear shape, a V shape, a V+1 shape, a double V shape, etc. The shape formed by the number of the magnet grooves is not particularly limited herein, and these shapes are all within the protection scope of the present embodiment.

Figure 2:
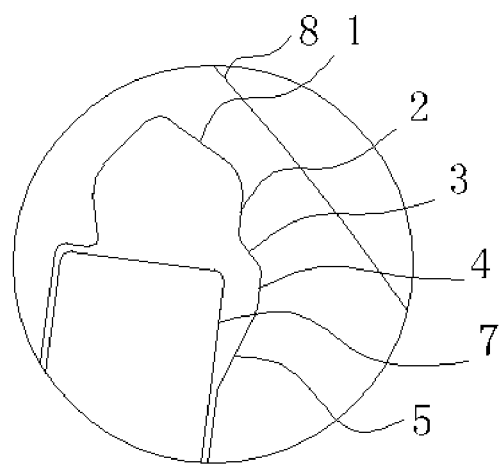
FIG. 2 is a partial enlarged view of the section V in FIG. 1 of the present disclosure.

Preferably, according to FIG. 1 and FIG. 2, the plurality of magnet grooves are divided into a number of pairs, each pair of the magnet grooves is V-shaped, and two ends of each of the magnet grooves are provided with the anti-demagnetization groove. Moreover, a flux barrier structure with a varying width may also be provided at the circumferential edge of the iron core.

In an embodiment, continue to refer to FIG. 1, the edge line of the magnet groove close to the circumferential edge of the iron core is a first tilted straight line segment or first arc segment 1.

In a preferred embodiment, the edge line of the anti-demagnetization groove comprises a fifth straight line segment 5 or a sixth straight line segment 6 connected to the long side of the magnet. The fifth straight line segment 5 is located at the upper anti-demagnetization groove; the sixth straight line segment 6 is located on the lower anti-demagnetization groove. The fifth straight line segment 5 or the sixth straight line segment 6 is not parallel to the long side 7 of the magnet.

Figure 3:
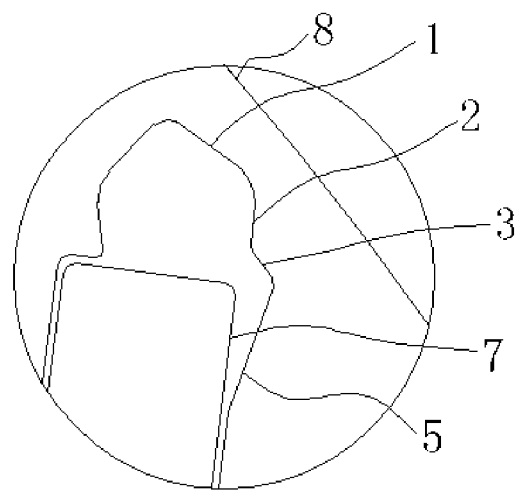
FIG. 3 is another partial enlarged view of the section V in FIG. 1 according to the present disclosure.

Further, according to FIG. 2 and FIG. 3, the edge line of the anti-demagnetization groove further comprises a third straight line segment 3 directly or indirectly connected to the fifth straight line segment 5. In FIG. 2, the edge line of the anti-demagnetization groove comprises a fourth straight line segment 4 connected to both the fifth straight line segment 5 and the third straight line segment 3, while in FIG. 3, the edge line of the anti-demagnetization groove does not comprise the fourth straight line segment 4, and the third straight line segment 3 is not parallel to the long side 7 of the magnet. Similarly, a second straight line segment 2 may further be provided between the first straight line segment 1 and the third straight line segment 3. According to FIG. 1, the first straight line segment or arc segment 1 may be connected to the second straight line segment 2, and a round chamfer is provided between the second straight line segment 2 and the first straight line segment or arc 1.

The above non-parallel or tilted straight line segments are used to improve the distribution of the magnetic field lines of the rotor, thereby reducing the demagnetization of the motor rotor.

In addition, the upper and lower ends of the magnet groove may also be provided with a position limiting line segment, and the position limiting line segment is used to limit the position of the magnet in the magnet steel groove and prevent the magnet from moving.

Figure 4:
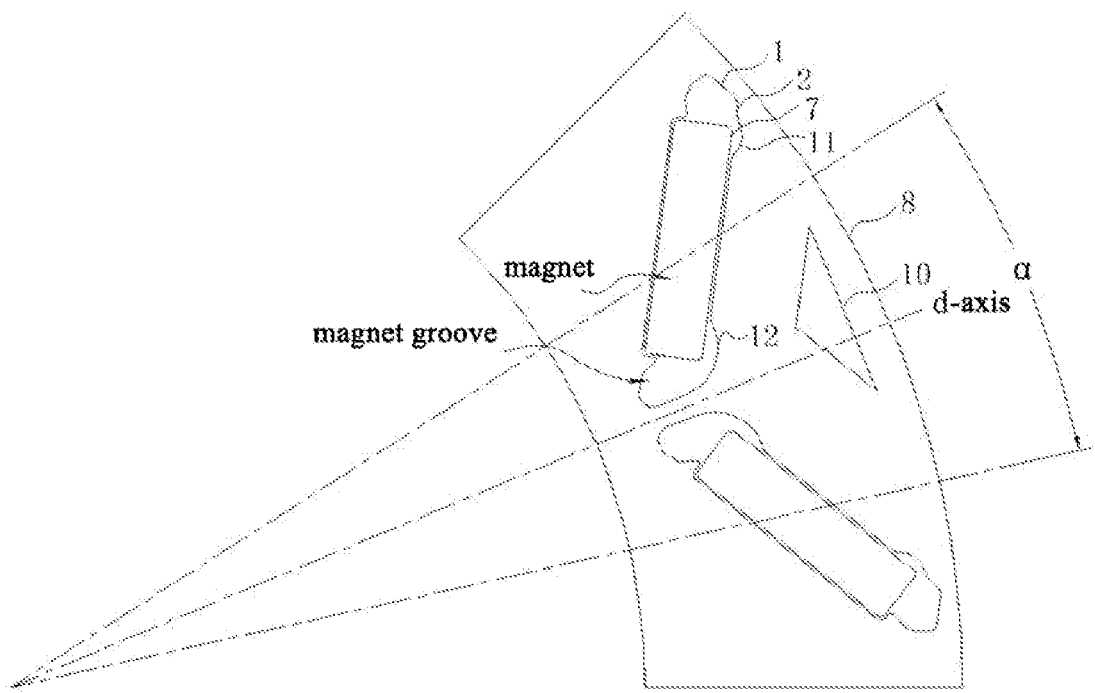
FIG. 4 is a partial schematic diagram of the structure of a rotor of interior permanent magnet motor according to another embodiment of the present disclosure.

In an embodiment, according to FIG. 4, the edge line of the anti-demagnetization groove is composed of a number of second arc segments 11 or third arc segments 12, and the second arc segment 11 or the third arc segment 12 tilts to the circumferential edge of the iron core at the position connecting with the long side of the magnet 7. The shape, size and position of the anti-demagnetization groove formed by the second arc segments are not limited.

Similarly, the edge line of the anti-demagnetization groove formed by arc segments is also used to change the distribution of the magnetic field lines of the rotor, so as to reduce the demagnetization.

In an embodiment, the edge line of the anti-demagnetization groove comprises any one or more of the following: a second arc segment 11, a third arc segment 12, a third straight line segment 3, a fourth straight line segment 4, a fifth straight line segment 5, or a sixth straight line segment 6. Alternatively, the anti-demagnetization groove is composed of any number of straight line segments and/or arc segments, and at least some of the other straight line segments tilt or extend toward the circumferential edge of the iron core, that is, close to the circumferential edge arc 8, thereby changing the distribution of the magnetic field lines of the rotor.

In an embodiment, the number of process slots 9 may be symmetrically arranged about the d-axis of the motor. The symmetrical arrangement may be the symmetrical distribution of a single process slot, or the symmetrical arrangement of a plurality of process slots relative to the d-axis, so as to obtain a good salient rate of the motor.

It should be noted that in the control of the permanent magnet synchronous motor, in order to obtain the control characteristics similar to the DC motor, a coordinate system is established on the motor rotor. The coordinate system rotates synchronously with the rotor, the direction of the rotor magnetic field is taken as the d-axis, and the direction perpendicular to the magnetic field of the rotor is the q-axis (i.e., quadrature axis). The decoupling of the d-axis and the q-axis can be realized by converting the mathematical model of the motor to this coordinate system, thereby obtaining good control characteristics.

The salient pole effect of the motor is that the d-axis inductance is inconsistent with the q-axis inductance in the permanent magnet synchronous motor. The d-axis permeability is less than the q-axis permeability, and the d-axis inductance is less than the q-axis inductance. The output torque of the motor includes an extra reluctance torque, and the motor can output a greater torque and power under the same current.

For a permanent magnet motor, when the load power factor is higher, the salient pole effect has a greater impact on the external characteristics, and the inherent voltage change rate can be effectively reduced by choosing a reasonable armature reaction reactance value and salient coefficient. In the present disclosure, the process slot 9 and the process slot 10 are provided so as to improve the salient rate and reluctance torque of the motor, and obtain better power conversion efficiency of the motor.

In an embodiment, according to FIG. 4, the process slots 10 are provided within a preset angle range around the direct axis of the motor, as shown by the angle $\alpha$ in FIG. 4. In FIG. 4, the angle $\alpha$ is 10 degrees, and a ratio of the area of the process slot to the area of the magnet groove is greater than or equal to a preset ratio, that is, the ratio of the area of the process slot to the area of the magnet groove cannot be lower than the preset ratio so as to increase the salient rate. For example, a ratio of the area of the process slot to the area of the magnet groove is greater than or equal to 5%

Preferably, the preset angle range is $(0\text{-}120)/p$ degrees, where p is a quantity of pole pairs of N and S magnetic poles formed in the motor rotor, and the ratio is 5%-50%. The setting of the above two ranges ensures that the motor rotor obtains a better salient rate.

The above descriptions are only embodiments of the present disclosure, and are not used to limit the protection scope of the present disclosure. Any modification, equivalent replacement, improvement, expansion, etc. made within the spirit and principle of the present disclosure shall all be included in the protection scope of the present disclosure.

What is claimed is:

1. A rotor structure of an interior permanent magnet motor comprising:
    a rotating shaft and an iron core arranged on the rotating shaft;
    a plurality of magnet grooves disposed inside the iron core along a circumferential direction, the plurality of magnet grooves being divided into a number of pairs, and each pair of magnet grooves being symmetrically arranged with respect to a direct axis (d-axis) of the motor;
    a magnet disposed in at least one of the plurality of magnet grooves;
    wherein an anti-demagnetization groove is provided respectively at upper and lower ends of a long side of each of the magnet grooves that is adjacent to a circumferential edge arc of the iron core, the anti-demagnetization groove is communicated with the magnet groove and used to reduce demagnetization at corners of the magnet, and
    wherein an edge line of the anti-demagnetization groove comprises directly-connected straight line segments or directly-connected arc segments that are directly connected with a long side of the magnet groove that is adjacent to the circumferential edge arc of the iron core, and the directly-connected straight line segments or the directly-connected arc segments are not parallel to a long side of the magnet and tilt or extend toward the circumferential edge arc of the iron core.

2. The rotor structure according to claim 1, wherein the edge line of the anti-demagnetization groove further comprises one or more non-directly-connected straight line segments or non-directly-connected arc segments that are directly or indirectly connected with the directly-connected straight line segments or the directly-connected arc segments, wherein the one or more non-directly-connected straight line segments or non-directly-connected arc segments are not parallel to the long side of the magnet and tilt or extend toward the circumferential edge arc of the iron core.

3. The rotor structure according to claim 2, wherein a shape of the anti-demagnetization groove at the upper end of the magnet groove is different from a shape of the anti-demagnetization groove at the lower end of the magnet groove.

4. The rotor structure according to claim 3, wherein a distance between an edge line of an upper top of the anti-demagnetization groove at the upper end and the circumferential edge arc of the iron core varies, so that a width of a flux barrier formed varies to reduce magnetic flux leakage in the motor.

5. The rotor structure according to claim 4, wherein the edge line of the upper top of the anti-demagnetization groove at the upper end is a straight line segment or arc segment tilted or extended toward the circumferential edge arc of the iron core.

6. The rotor structure according to claim 1, wherein the edge line of an upper top of the anti-demagnetization groove at the upper end is a straight line segment or arc segment tilted or extended toward the circumferential edge arc of the iron core.

7. The rotor structure according to claim 1, wherein a number of process slots are disposed along an inner circumference of the iron core between each pair of magnet grooves, and the process slots are used to increase a salient rate and reluctance torque of the motor, and reduce a motor rotor weight.

8. The rotor structure according to claim 7, wherein the process slots are symmetrically arranged about a direct axis of the motor.

9. The rotor structure according to claim 7, wherein the process slots are provided within a preset angle range around the direct axis of the motor, and a ratio of an area of the process slot to an area of the magnet groove is greater than or equal to 5%.

10. The rotor structure according to claim 9, wherein the preset angle range is (0-120)/p degrees, where p is a quantity of motor pole pairs, and the ratio is 5%-50%.

11. The rotor structure according to claim 2, wherein a number of process slots are disposed along an inner circumference of the iron core between each pair of magnet grooves, and the process slots are used to increase a salient rate and reluctance torque of the motor, and reduce a motor rotor weight.

12. The rotor structure according to claim 11, wherein the process slots are symmetrically arranged about a direct axis of the motor; or the process slots are provided within a preset angle range around the direct axis of the motor, and the preset angle range is (0-120)/p degrees, where p is a quantity of motor pole pairs, and a ratio of an area of the process slot to an area of the magnet groove is 5%-50%.

13. The rotor structure according to claim 3, wherein a number of process slots are disposed along an inner circumference of the iron core between each pair of magnet grooves, and the process slots are used to increase a salient rate and reluctance torque of the motor, and reduce a motor rotor weight.

14. The rotor structure according to claim 13, wherein the process slots are symmetrically arranged about a direct axis of the motor; or the process slots are provided within a preset angle range around the direct axis of the motor, and the preset angle range is (0-120)/p degrees, where p is a quantity of motor pole pairs, and a ratio of an area of the process slot to an area of the magnet groove is 5%-50%.

15. The rotor structure according to claim 4, wherein a number of process slots are disposed along an inner circumference of the iron core between each pair of magnet grooves, and the process slots are used to increase a salient rate and reluctance torque of the motor, and reduce a motor rotor weight.

16. The rotor structure according to claim 15, wherein the process slots are symmetrically arranged about a direct axis of the motor; or the process slots are provided within a preset angle range around the direct axis of the motor, and the preset angle range is (0-120)/p degrees, where p is a quantity of motor pole pairs, and a ratio of an area of the process slot to an area of the magnet groove is 5%-50%.

17. The rotor structure according to claim 5, wherein a number of process slots are disposed along an inner circumference of the iron core between each pair of magnet grooves, and the process slots are used to increase a salient rate and reluctance torque of the motor, and reduce a motor rotor weight.

18. The rotor structure according to claim 17, wherein the process slots are symmetrically arranged about a direct axis of the motor; or the process slots are provided within a preset angle range around the direct axis of the motor, and the preset angle range is (0-120)/p degrees, where p is a quantity of motor pole pairs, and a ratio of an area of the process slot to an area of the magnet groove is 5%-50%.

\* \* \* \* \*